L. A. MATTHEWS.
BENCH DOG.
APPLICATION FILED OCT 25, 1920.
1,424,842.
Patented Aug. 8, 1922.
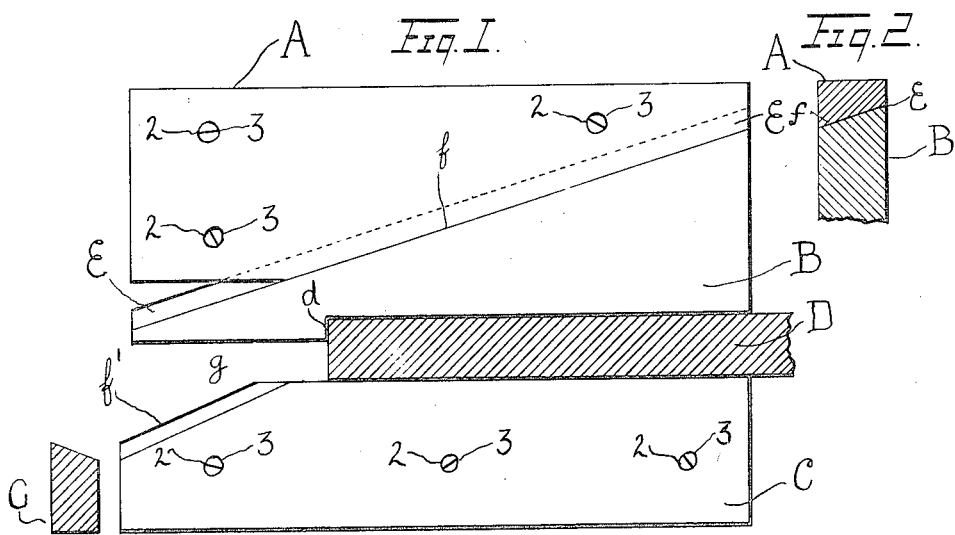
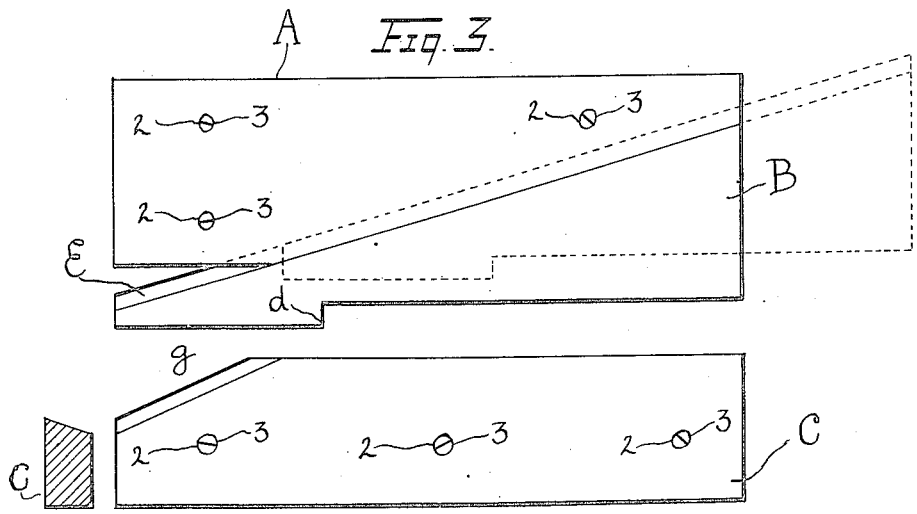
INVENTOR
Leo A Matthews
BY
F. N. Gilbert
ATTORNEY

UNITED STATES PATENT OFFICE.

LEO A. MATTHEWS, OF BINGHAMTON, NEW YORK.

BENCH DOG.

1,424,842.　　　　Specification of Letters Patent.　　Patented Aug. 8, 1922.

Application filed October 25, 1920. Serial No. 419,498.

*To all whom it may concern:*

Be it known that I, LEO A. MATTHEWS, a citizen of the United States, residing at Binghamton, in the county of Broome and State of New York, have invented certain new and useful Improvements in Bench Dogs, of which the following is a specification.

My invention relates to improvements in adjustable "wedged dogs," for work benches, and it has for its object to provide a cheap and convenient, and easily constructed device, which will effectively hold boards and other materials, while being planed or shaped on the work bench. With these objects in view, my invention consists in certain novel features of construction and arrangement of parts as will be hereinafter more fully described, and pointed out in the claim, reference being had to the accompanying drawings, in which—

Fig. 1, is a plan view of my device.

Fig. 2, is a fragmentary view of a part of my device.

Fig. 3, is a plan view of my device.

The same reference characters denote corresponding parts throughout the several views of the drawings.

In reducing the invention to practice, there is employed a pair of guides or supports A and C, preferably formed of wood or other suitable material, both of the guides being provided with openings 2, through which are passed suitable fasteners 3 for the securing of the guides on the upper surface of a bench (not shown). It is to be observed that the guides are arranged in the desired spaced relation, the outer side edges of the guides being straight and arranged parallel with respect to each other. The guide or support A has the major portion of its inner edge cut on a slant and bevelled inwardly as at $f$, while the guide or support C has the major portion of its inner side edge cut straight with the remaining inner end portion cut away on a slant and bevelled outwardly as at $f'$.

Coacting with the guides for the purpose of clamping a piece of work D, there is provided a triangular clamping wedge B, the side edge E adjacent the edge $f$ of the guide A, being arranged at a corresponding slant and bevel as that of the said side $f$, while the opposite edge of said wedge B is arranged at right angles to its base and parallel to the opposite edge of the guide C. In addition this edge E is offset as at $d$ to form a shoulder or header. This shoulder is arranged so as to be contacted by the inner end of the piece of work D and acts as a brace or stop therefor.

In use, assuming that the parts have been assembled in the manner described, the wedge B is moved inwardly or outwardly between the guides A and C so as to correspondingly restrict or widen the space between the guide C and said wedge B. When these parts are arranged at the desired position of adjustment, the piece of work D to be planed is placed against the shoulder or header $d$, and, moved inwardly with the wedge so as to securely clamp the board between the wedge and guide C, and the wedge against the guide A. The pressure of the work D, through the action of planing is exerted against the shoulder and thus the greater this pressure, the more firmly is the piece of work D held in position. The correspondingly slanting and bevelled edges $f$ and E of the guide A and wedge B, respectively, prevent accidental disengagement of the wedge B from operative position. It is to be noted that the space betwen the slanting edge $f''$ and the inner portion of the side edge of the wedge adjacent the shoulder $d$ constitutes an extended opening $g$, through which shavings may pass outwardly beyond the piece of work being planed and removed while the device is in use. In previous types of devices of this nature, no provision has been made, such as the opening $g$, beyond the shoulder $d$ or the end of the work D, for the removal of shavings. Ordinarily these shavings continually clog into the space in front of the header, and from the pressure of the material being planed, become thoroughly wedged and prevent the proper and effective operation of the device. The slanting edge $f'$ assures of the passage of shavings, regardless of whether a narrow piece of work is being planed, it being only necessary to maintain the shoulder $d$ opposite said slanting edge $f'$, when such narrow pieces are to be planed to ensure of the provision of the extended opening $g$.

It is believed in view of the foregoing description that a further detailed description is entirely unnecessary. Likewise it is believed that the advantages of the invention will be readily apparent.

Having thus described my invention what I claim as new and for which I desire Letters Patent is as follows:

A device of the character described, including a pair of guides, means for securing the guides to a bench, the inner edge of one of the guides having the main portion of its inner edge cut slantingly and bevelled inwardly, a wedge of triangular form having one side edge arranged on a slant and bevelled outwardly for coacting with the complemental edge of said guide and having its other side edge arranged at a right angle to its base and offset to form a shoulder, and the other guide having its inner side edge straight and the inner corner of said side edge being cut away at a slant and bevelled outward to provide an opening for the passage of shavings, substantially as and for the purposes set forth.

In testimony whereof I have affixed my signature.

LEO A. MATTHEWS.